United States Patent [19]

Harris

[11] Patent Number: 5,524,711

[45] Date of Patent: Jun. 11, 1996

[54] AGRICULTURAL IMPLEMENT FOR FORMING PLANTING ROWS

[76] Inventor: Tom J. Harris, Rte. 2, Box 216, Littleton, N.C. 27850

[21] Appl. No.: 327,901

[22] Filed: Oct. 24, 1994

[51] Int. Cl.⁶ .......................... A01B 33/04; A01B 5/04; A01B 49/02

[52] U.S. Cl. .............. 172/67; 172/68; 172/146; 172/70; 172/112; 172/122; 172/149; 172/175; 172/701; 172/135

[58] Field of Search ................... 172/63, 67, 68, 172/70, 76, 79, 112, 118, 119, 122, 123, 145, 146, 149, 150, 151, 165, 166, 174–176, 180, 196, 701, 135

[56] References Cited

U.S. PATENT DOCUMENTS

| | | | |
|---|---|---|---|
| 3,224,347 | 12/1965 | Seaman | 172/68 |
| 3,316,865 | 5/1967 | Williams | 172/68 |
| 3,347,188 | 10/1967 | Richey | 172/63 |
| 3,437,061 | 4/1969 | Wells | 172/112 |
| 3,533,987 | 11/1970 | Taylor | 172/112 |
| 3,661,213 | 5/1972 | Taylor | 172/112 |
| 4,088,083 | 5/1973 | Dail, Jr. et al. | 172/70 |
| 4,258,635 | 3/1981 | Lutz et al. | 172/70 |

*Primary Examiner*—Randolph A. Reese
*Assistant Examiner*—Spencer Warnick
*Attorney, Agent, or Firm*—Rhodes, Coats & Bennett

[57] ABSTRACT

The present invention entails an agricultural implement for forming planting rows with a minimum of tillage. The implement of the present invention is designed to form a multiplicity of rows and accordingly includes a series of side-by-side row units. Each row unit includes a front colter, a ripper which follows the colter, a rotor tiller assembly disposed behind the ripper, a pair of laterally spaced soil confining panels extending between the ripper and the rotor tiller assembly, and a final following soil packer. Once the agricultural implement has traversed a certain area of the land, there is formed a multiplicity of planting rows with the area between the formed planting rows being untilled.

13 Claims, 5 Drawing Sheets

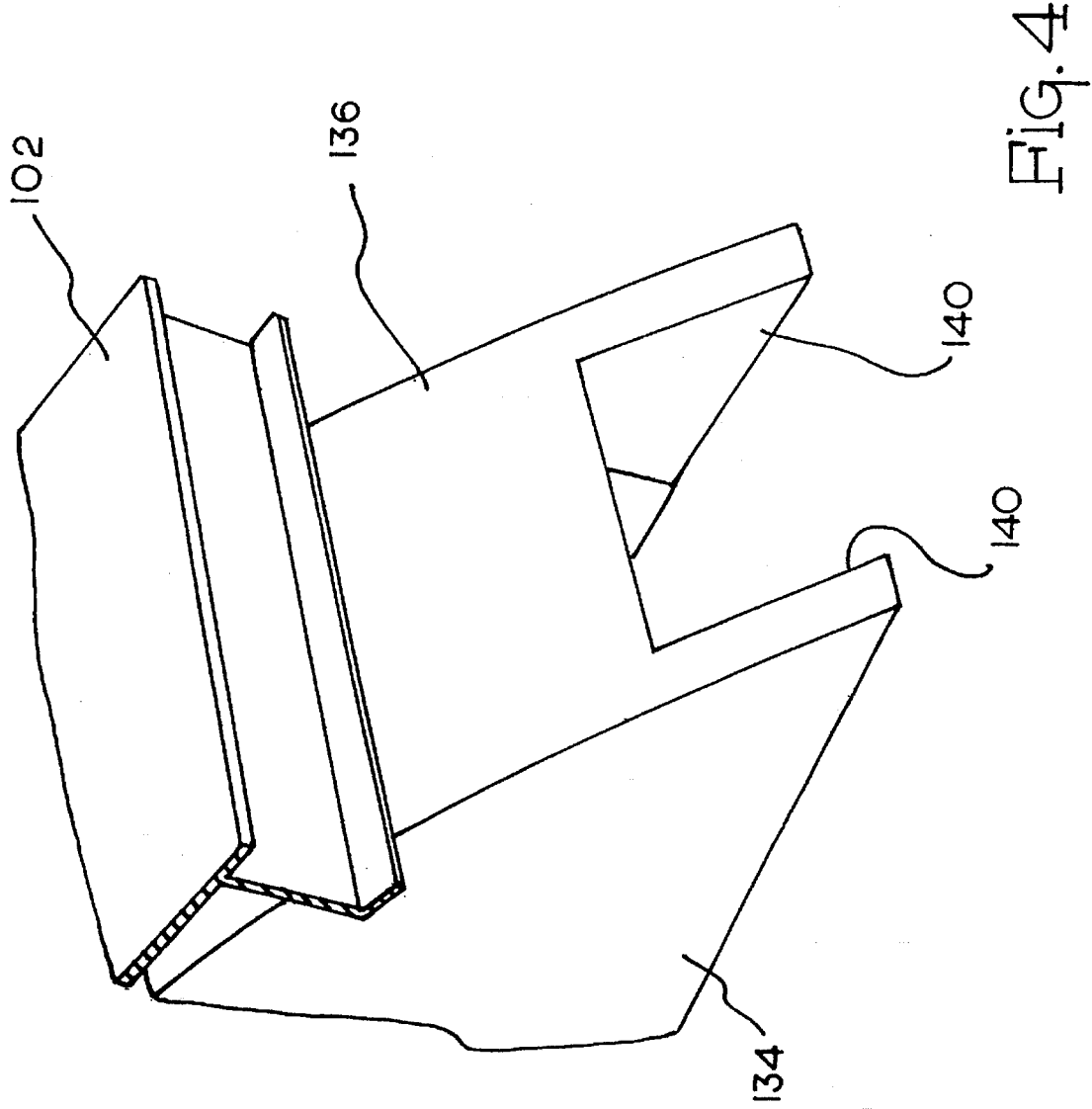

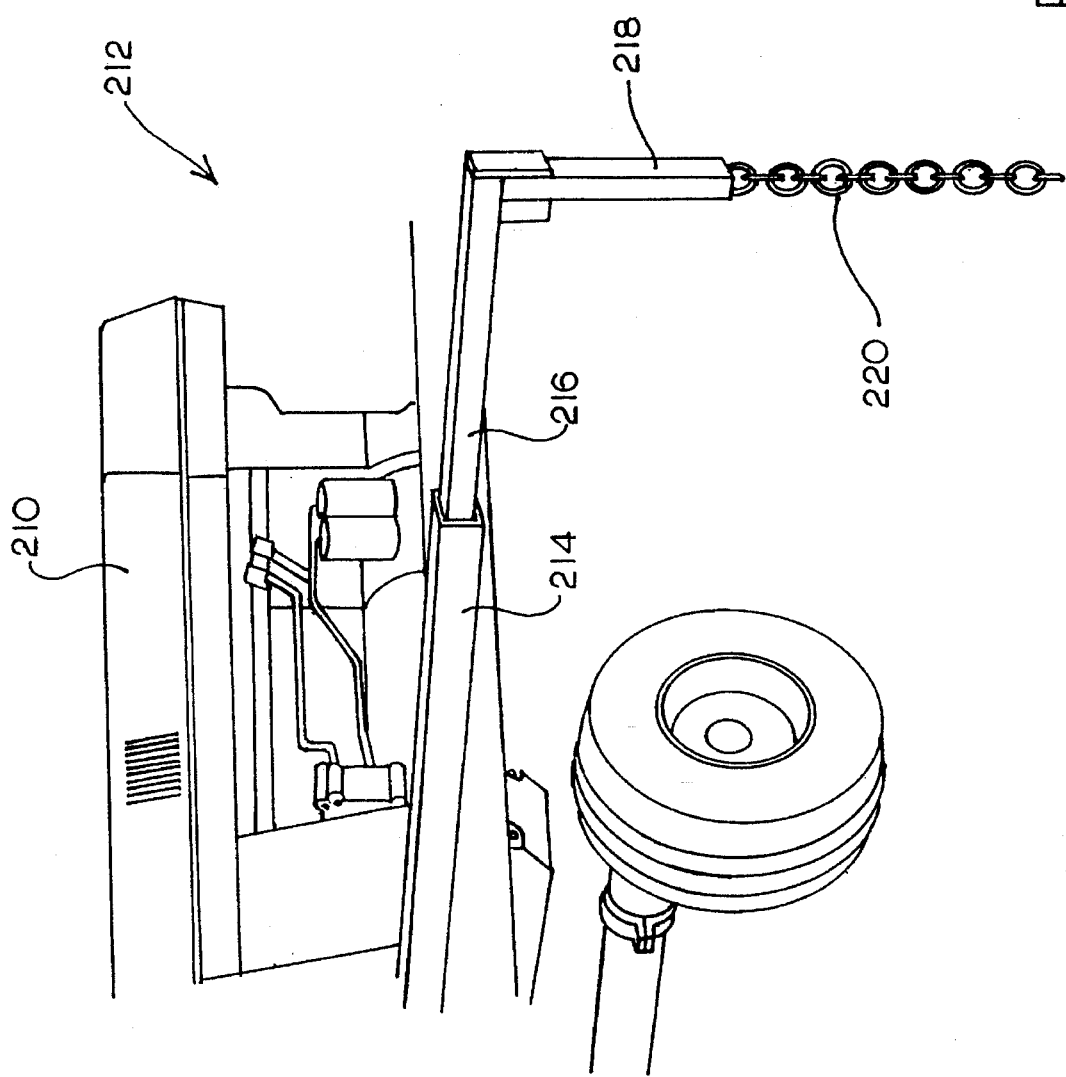

AGRICULTURAL IMPLEMENT FOR FORMING PLANTING ROWS

FIELD OF INVENTION

The present invention relates to agricultural implements and more particularly to an agricultural implement for forming a series of planting rows or row beds with a minimum amount of actual ground tillage occurring such that the areas defined between the formed rows is substantially untilled. More particularly, the present invention relates to an agricultural implement that prepares land for planting and which includes at least one row unit comprised of a colter, ripper, rotor tiller assembly, a pair of laterally spaced soil confining plates extending between the rotor tiller assembly and the ripper, and a soil compactor.

BACKGROUND OF THE INVENTION

Conventional land preparation practice for planting is often very harsh because conventional practices tend to extensively till and disrupt the soil. This situation is made worse by the fact that this same practice is repeated over and over again between planting seasons. Typically, after a certain crop has been harvested, the farmer extensively tills and conditions the land for a new planting. Many conventional practices call for the land to be first subjected to a very intense and extensive disking operation. The land is usually traversed by a large and heavy gain disk implement which results in any ground cover being cut and tilled into the earth. After disking, many conventional land preparation practices include extensively plowing the entire land which essentially results in the top soil or top layers of the soil being turned and rotated. Again, once the land has been subjected to both disking and plowing the entire top layer of the land has been totally disturbed and the previous ground cover essentially removed.

Obviously, the extensive cultivation process discussed above destroys much of the land's natural value and makes it more difficult for the land itself to be protected from heavy rains and other inclement weather conditions. This extensive cultivation also disrupts the life and reproduction cycles of microorganisms and worms found in the top layer of the cultivated soil. The destruction of these microorganisms and worms are very harmful inasmuch as these microorganisms and worms tend to aerate the soil and provide a better growing environment for crops. Moreover, these microorganisms and worms reproduce and proliferate and add organic matter to the soil. Intense cultivation of the land destroys these microorganisms and consequently deprives the soil of a continued source of organic matter.

Therefore, there continues to be a need for a tillage practice for preparing land for planting that emphasizes conserving the soil and preventing the destruction of microorganisms and worms found in the top layer of the soil.

SUMMARY AND OBJECTS OF THE INVENTION

The present invention relates to a tillage implement that is used to prepare land for planting. The agricultural tillage implement of the present invention is designed to minimize the actual tillage and breaking of the ground while at the same time preparing an adequate plant bed or beds for all types of crops including peanuts, corn, etc.

The agricultural implement of the present invention includes a series of laterally spaced row units with each row unit designed to form and prepare a row for planting. Each row unit includes a front running colter which is followed by a ground penetrating soil ripper. Disposed behind the ripper is a rotor tiller assembly that tills a relatively narrow and shallow swath of soil. Extending between the rotor tiller assembly and the ripper is a pair of laterally spaced panels that tends to confine the soil passing therebetween and effectively directs the soil into the front end or intake area of the rotor tiller assembly. Disposed behind the rotor tiller assembly is a soil compactor which rides over the tilled swath of soil and tends to compact and smooth the same for planting.

It is therefore an object of the present invention to provide an agricultural implement that is capable of preparing land for planting with a minimum amount of actual tillage required.

It is a further object of the present invention to provide a tillage cultural practice that enhances and conserves the land and which does not disturb and destroy the living organisms (such as worms) that occupy and work the top soil and top layers of the land.

Another object of the present invention is to provide an agricultural implement of the character referred to above that is of a multi-row design but which is designed to be compact and to be adapted to fit relatively close behind a farm tractor such that the entire implement as a whole can be controlled and easily manufactured.

A further object of the present invention is to provide an agricultural tillage implement of the character referred to above that includes a main frame structure that is made up of a ripper subframe and a rotor tiller subframe and wherein there is provided a connecting hitch for connecting the two subframes together in a compact fashion that allows the ripper subframe and rotor tiller subframe to be lifted together in unison.

Another object of the present invention resides in the provision of a method for preparing land for planting that forms a series of laterally spaced rows that have been minimally tilled wherein the land or soil lying between the minimally tilled rows is left undisturbed.

Other objects and advantages of the present invention will become apparent and obvious from a study of the following description and the accompanying drawings which are merely illustrative of such invention.

BRIEF DESCRIPTION OF THE DRAWINGS

FIG. 4 is a fragmentary perspective view showing a portion of the rear housing of a respective rotor tiller assembly.

FIG. 5 is a fragmentary perspective view of a tractor showing a row marker associated therewith.

DETAILED DESCRIPTION OF THE INVENTION

Figure 1:
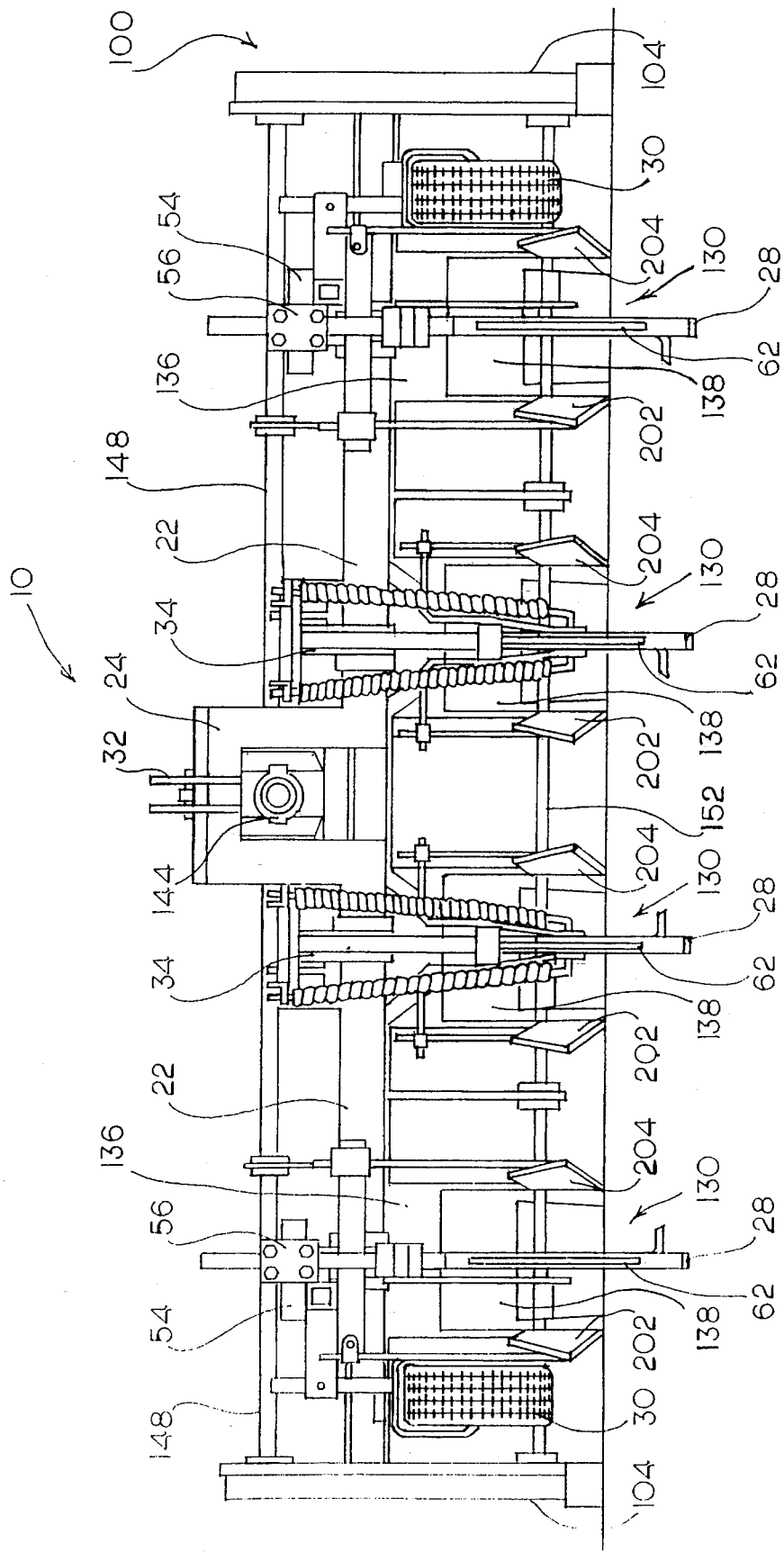
FIG. 1 is a front elevational view of the multi-row agricultural implement of the present invention.

With further reference to the drawings, the agricultural implement of the present invention is shown therein and indicated generally by the numeral 10. As will be appreciated from subsequent portions of this disclosure, the agricultural implement 10 is designed to prepare rows for planting with a minimum of tillage. More particularly, the agricultural implement 10 of the present invention will prepare a series of laterally spaced rows for planting with the areas of land disposed between the row being essentially untilled.

Before describing the structure of the agricultural implement 10 in detail, it may be beneficial to review the basic components of the machine. In this regard, agricultural implement 10 is a multi-row machine and accordingly includes a series of laterally spaced row units. Each row unit of the implement 10 includes a front running colter or disk that cuts downwardly into the soil as the implement is pulled through a field. The colter essentially defines the middle of the row formed by the implement 10. Disposed behind the colter and aligned therewith is a soil ripper that digs a relatively narrow trench in the soil. Disposed behind the ripper is a rotor tiller assembly that tills a relatively narrow and shallow swath of soil. Extending between the ripper and the rotor tiller assembly is a pair of laterally spaced soil confining (blowout) panels. The soil confining panels tend to confine the disturbed soil between the panels as the implement 10 is moved through the field. Finally, positioned behind the rotor tiller assembly in each row unit is a soil compactor which compacts the swath of land or soil that has been prepared for planting by the rotor tiller assembly.

Now, turning to a description of the agricultural implement 10, it is seen that the same includes a main frame structure which is made up of two basic components. First, the main frame structure includes a ripper subframe that extends across the forward portion of the implement 10. Also, the main frame structure includes a rotor tiller subframe structure that is disposed behind the ripper subframe assembly. Both the ripper and rotor tiller subframe structures are tied or connected together such that they can be lifted in unison. However, it will be appreciated that the connection between the rotor tiller subframe structure and the ripper subframe structure is not totally rigid but is designed such that the rotor tiller subframe structure and the ripper subframe structure can float or move independently with respect to the other subframe structure as the implement traverses the field.

Now, turning to the ripper subframe structure it is seen that the same includes a pair of side beams 22 that are joined together by an inverted U-shaped frame 24. A series of rippers 28 are pivotally mounted to the side beams 22 via pivot pin 29. Thus, as the machine is pulled through the field, the respective rippers 28 will engage and penetrate the soil and will effectively form an elongated, relatively narrow trench through the soil. Although the depth of the respective rippers 28 can be varied, it is contemplated that in many applications the rippers will penetrate the soil to a depth of approximately seven to nine inches deep. This will break up the land and prepare it for the tilling operation that follows and which is carried out by the respective rotor tiller assemblies to be subsequently described. In addition, the rippers 28 form open areas within the soil which enable plant roots to grow and extend therein.

The ripper subframe assembly includes a conventional three point hitch that allows the entire agricultural implement 10 to be connected to a conventional farm tractor. In this regard, the three point hitch associated with the ripper subframe structure includes a top clevis 32 and a pair of lower spaced apart side clevises 34.

Figure 3:
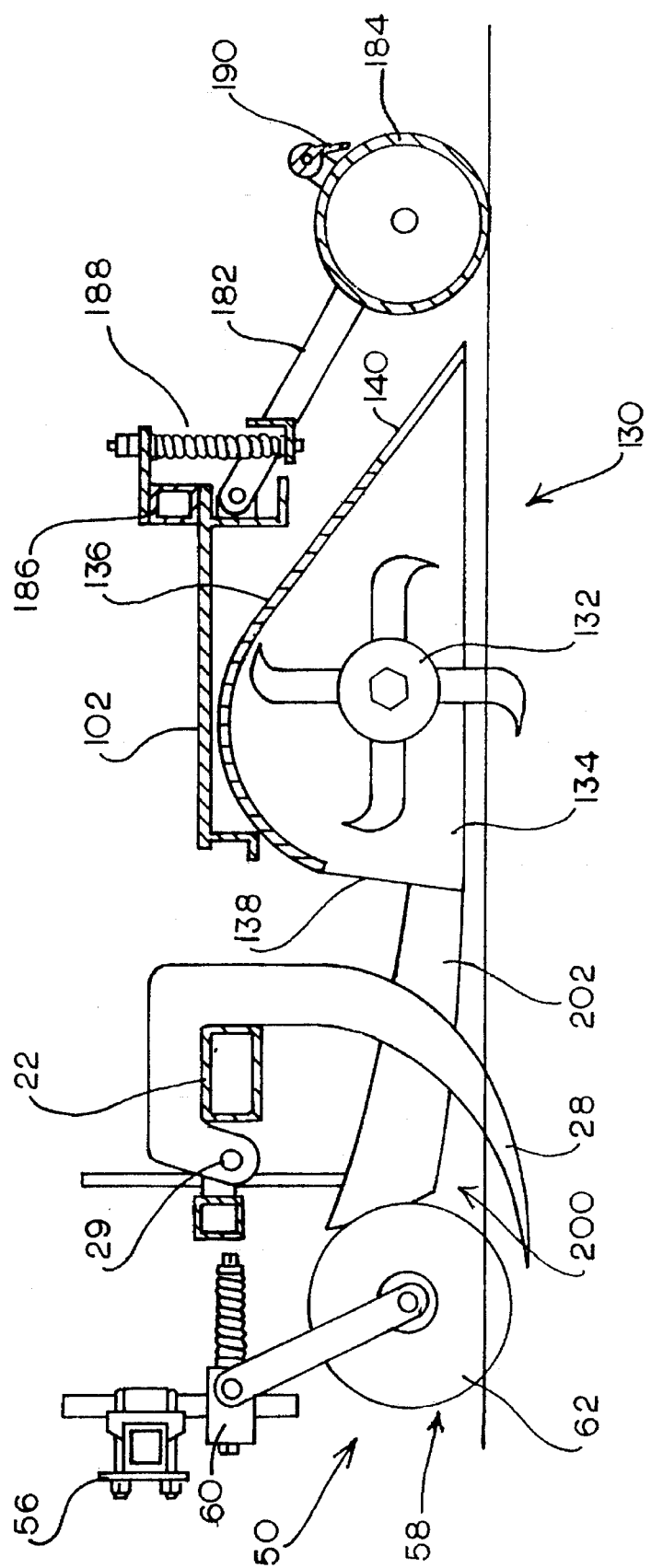
FIG. 3 is a side schematic illustration of the basic components of each row unit of the agricultural implement of the present invention.

As seen in the drawings, preceding each ripper 28 is a colter or disk 62. Each colter or disk 62 is supported from the ripper subframe structure and is in fact aligned with the penetrating tip of a respective ripper 28. As seen in the drawings, each colter 62 is supported from a frame structure that extends from or depends from the ripper subframe structure. The frame structure for supporting the two outside colters is somewhat different from the frame structure that supports the two inside colters. However, it is appreciated that various types of frame structures can be incorporated to support the respective colters 62. In any event, each outside subframe structure for supporting the outside colters 62 includes a longitudinal member secured to a respective side beam 22 of the ripper subframe and the longitudinal member 52 projects forwardly therefrom. Secured to a forward portion of the longitudinal member 52 is a crossmember 54. Mounted on the crossmember 54 is a mounting bracket 56 that supports and holds the colter assembly 58. As seen in the drawings, each outside colter assembly 58 includes a swivel frame 60 that supports a colter or disk 62 therefrom. Note in FIG. 3 that the colter 62 is carried by a downwardly angled arm that is pivotally connected to the swivel frame 60.

Turning to a discussion of the frame structure utilized to support the two inside colters 62, it is seen that the inside frame structures include a lower frame made up of a pair of laterally spaced side frames 64 that project forwardly from the ripper frame structure. A pivot axis or pivot pin 70 extends between the front portions of the side arm 64. A pair of pivoting colter carriers 66 are connected to the pivot pin 70 and extend downwardly and at an angle therefrom. A colter 62 is rotatively mounted about an axis that is connected between the colter carriers 66. Disposed over the lower structure of the inside colter frames is an upper structure that includes an upper U-shaped frame structure 72. A pair of spring arms 74 extend downwardly from the upper frame structure 72 to the side arms 64 of the lower frame structure. Because the lower frame structure of the inside colters move up and down, the spring arms 74 are connected to the upper frame 72 by a pivot pin or pivot axis. Thus, it is appreciated that the lower frame of the inside colters can move up and down as the agricultural implement 10 traverses the land. At the same time, the spring arms 74 tend to bias the lower frame downwardly such that the colters 62 forming a part of the inside colter frame structure are biased to engage and to cut into the soil.

The depth of penetration of the respective colters 62 may vary depending on application and field conditions. However, in a typical situation, the colters will cut a depth of approximately six to eight inches and in the process will cut roots and other debris and will effectively divide the soil or land and the open cut of the colter will facilitate the trenching action of the following ripper 28.

Disposed behind the respective rippers 28 and the ripper subframe structure, is a rotor tiller subframe structure indicated generally by the numeral 100. The rotor tiller subframe structure includes an upper frame 100 and a pair of downwardly depending side panels 104. The rotor tiller section or frame structure 100 includes a three point hitch attachment that enables the entire rotor tiller frame structure and the rotor tillers carried thereby to be coupled closely and directly to the ripper subframe structure. In this regard, the three point hitch attachment associated with the rotor tiller frame structure 100 includes a pair of lower connectors 106 and an upstanding connecting yoke 108. A pair of diagonal braces 112 extend from the lower connectors 106 to the top of the connecting yoke 108. A horizontal connector 116 is connected between the top of yoke 108 and the top clevis 32 formed on the inverted U-shaped frame 24 of the ripper frame structure. There is also provided a lower side connecting plate 114 that is secured to the ripper frame structure and which is also pivotally connected to the rotor tiller frame structure and which allows the rotor tiller frame structure to float and move up and down with respect to the ripper subframe. Also, the rotor tiller frame structure is connected to the ripper subframe structure via a connecting link 116 that extends again between the rotor tiller section 100 and the ripper subframe.

As seen in the drawings, there is provided a series of laterally spaced rotor tiller assemblies 130 that form a part of the total rotor tiller section 100 of the implement 10. Each rotor tiller assembly 130 includes a rotor tiller and a surrounding housing structure. In particular, the rotor tiller portion includes a blade tiller assembly 132. The blade tiller assembly 132 is surrounded by a housing that includes a pair of side panels 134 and a top 136. Formed in the front of the housing is a front opening 138 and formed about the rear of the housing is a rear opening 140. Note in FIG. 4 where the rear opening 140 includes a pair of opposed tail ends 142. The rolled tail ends 142 tend to taper inwardly and are slightly angled along the inside wall of the rolled tailed ends 142. As will be appreciated from subsequent portions of this disclosure, the function of the housing structure surrounding the rotor tiller blade assembly 132 is to confine the tilled soil around the blade assembly 132. In operation the lower edge of the entire housing structure is spaced approximately flush to the ground being traversed so as to prevent dirt particles being propelled by the blade from being flung or propelled outside the confines of the housing structure. Consequently, the respective housing structures surrounding the individual rotor tiller blade assemblies 132 will extend down just short of the ground surface.

Now, turning to the rotor tiller drive, there is a main drive shaft 144 that leads to a gear box 146 and which is driven by the pto of a tractor. From the gear box 146 torque is directed to a pair of side drives 148. Side drives 148 extend to the outboard sides of the rotor tiller frame section 100 and there the torque associated with the side drives 148 is transferred downwardly via a chain drive (not shown) which directs torque to a lower drive shaft 152 that extends to and through the respective rotor tiller blade assemblies 132.

The agricultural implement of the present invention is provided with a pair of soil confining panels 200 that extend between each set of rippers 28 and the respective trailing rotor tilling assemblies 130. The function of the soil confining panels 200 is to confine loose and agitated soil to the area defined by the pair of panels 202 and 204 that comprise the soil confining panels. More particularly, as the implement is pulled through the field, the soil lying ahead of the rotor tiller assemblies 132 will tend to be agitated and disturbed and often the soil will tend to spread and move out of the path of the oncoming rotor tiller assemblies 132. The pair of panels 202 and 204 tend to confine this soil between the two panels. Note in the drawings that the panels are supported in the front by the ripper subframe assembly and at the rear by the side panels 134 of the housing that extends around the individual rotor tiller assemblies. Also note that the lower edge of the respective panels 202 and 204 are spaced slightly above the soil level such that they do not continuously engage the upper surface of the soil. However, the panels 202 and 204 are spaced close enough to the ground that the soil or dirt passing therebetween is confined within the panels during the tilling operation.

Finally, disposed behind the individual rotor tiller assemblies 130, there is a rear compactor indicated generally by the numeral 180. Each rear compactor includes a frame structure that comprises a pair of pivotally mounted floating arms 182. A compactor roller 184 is rotatively mounted about the rear end portion of the floating arms 182. A mounting bracket 186 is secured to the top 102 of the rotor tiller frame structure. A hold down spring 188 is connected between the mounting bracket 186 and the respective arms 182 and biases the roller 184 downwardly into engagement with the tilled bed prepared by the preceding rotor tiller assembly. This, of course, enables the compactor 180 to float and move up and down as the agricultural implememt 10 moves over undulations in the field. To clean the rotating roller 184 there is provided a wiper blade or bar 190 that extends across a top portion of the rotating roller 184 which tends to clear and wipe dirt and debris from the roller 184 during the tilling operation.

As indicated beforehand, it is an important feature of the present invention that the frame assemblies that carry the individual components of the agricultural implement 10 are connected and disposed in a compact relationship. In fact, the entire implement 10 is designed such that the rear wheels of the tractor are disposed between the respective colters 62 that project forwardly from the ripper subframe structure. Note the wheel areas 200 indicated in FIG. 2.

Figure 2:
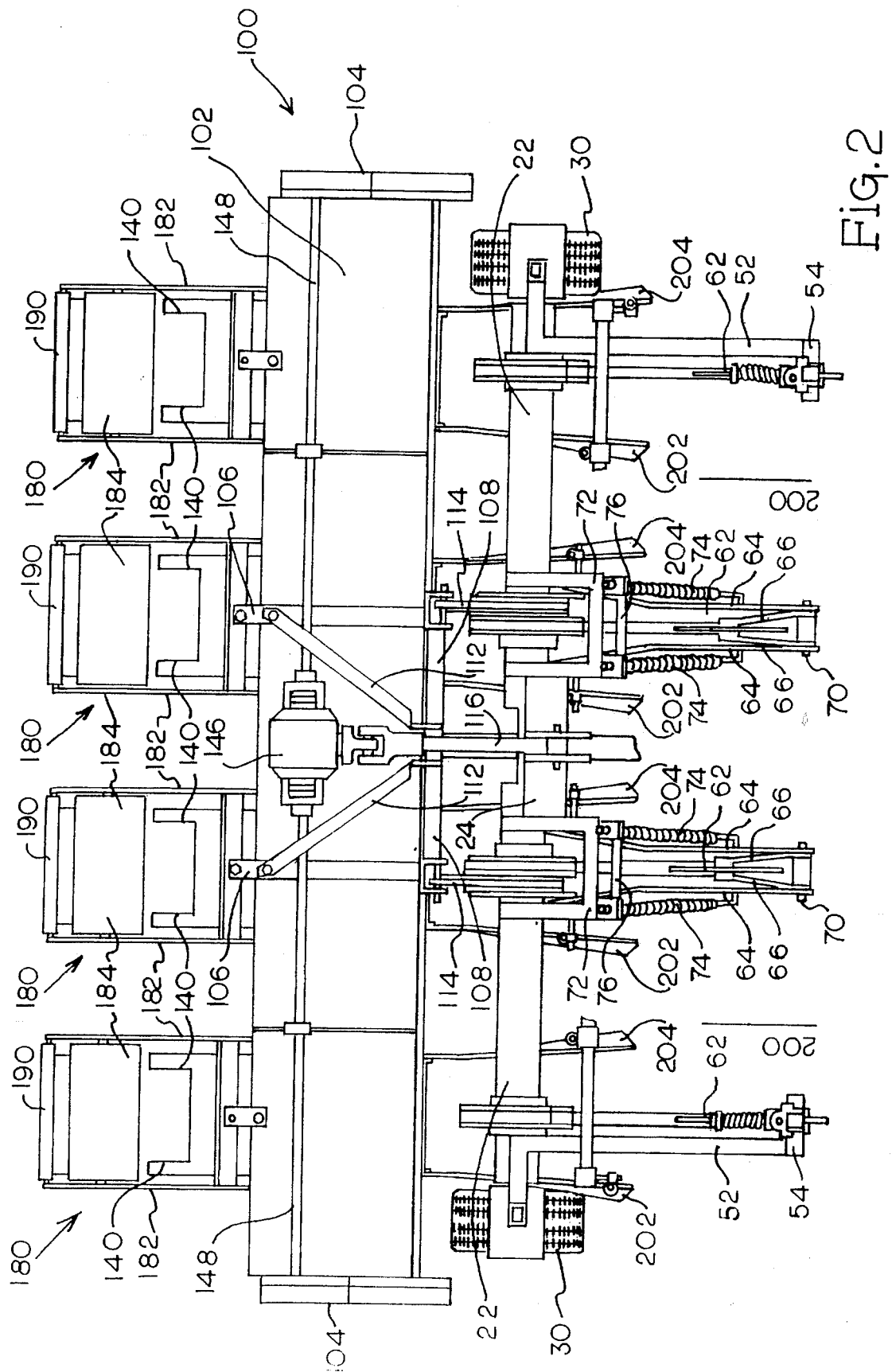
FIG. 2 is a top plan view of the agricultural implement of the present invention.

In operation, the agricultural implement 10 of the present invention is connected to the three point hitch of a conventional tractor such that the rear tractor wheels occupy the areas 200 in FIG. 2. Consequently, the entire main frame structure of the implement 10 is tucked compactly adjacent the rear of the tractor.

Also, the tractor can be provided with a simple and inexpensive row marker that would include a dangling chain or other marking device that the tractor operator would align with a previously formed row. This enables the tractor operator to appropriately space the rows being formed. In this regard, note FIG. 5 which shows a tractor 210 that is provided with a simple and inexpensive and yet practical row marker. The tractor marker includes a fixed horizontal member 214 that is secured to the front of the tractor and extends outwardly to either side of the tractor. Secured within the fixed horizontal member 214 is a telescoping extension 216. Secured to the outer remote end of the telescoping extension is a drop tube 218. A marker chain 220 extends through the drop tube 218 and dangles downwardly. The telescoping extension 216 is appropriately adjusted such that when the chain 220 is aligned and hangs over the last row formed the tractor 210 will be appropriately aligned to form the next series of rows.

As the implement 10 is pulled through the field, the respective colters 62 cut a slit in the soil. Again, the depth of the slit or cut can vary but in typical applications the depth would be approximately six to eight inches. As the implement 10 is pulled through the field, the penetrating point of the individual rippers 28 cut through the slit formed by the preceding colter 62. Again, the depth of penetration of the ripper 28 may vary but in typical applications it is contemplated that the same would extend seven to nine inches deep. As the implement 10 is pulled through the field the blades of the rotor tiller assembly attack the soil and form a tilled row-type planting bed. The rotor tiller assemblies can be set for a depth penetration of three and one-half to five inches deep. This can vary, depending on application and field conditions. It is contemplated that the swath treated or conditioned by the rotor tiller would be approximately nine inches wide. As the rotor tiller engages the soil and cuts and flings the soil around inside the surrounding housing structure, it is appreciated that the soil is confined about the blades of the rotor tiller by the housing structure itself.

In the area preceding the inlet opening 138 of the housing structure, the confining soil panels 202 and 204 continue to confine the soil and other debris between the two panels. Effectively, the panels tend to channel the soil and dirt into the front or inlet opening 138 of the housing associated with the individual rotor tiller assemblies 130. Also, it is appreciated that the tail end opening 140 of the housing includes a slightly tapered and rolled tail end 142 that tends to finish off the formed row bed. The affect of the rolled tail end 142 tends to shape and form a neat row bed that exits the housing structure overlying the individual rotor tiller assemblies 130.

The final conditioning of the formed row beds is carried out by the compacting rollers 180. The rollers roll over the previously tilled swath of soil and compact the same and prepare that area for future planting of any desirable crop.

Therefore, it is appreciated that the agricultural implement 10 of the present invention forms a series of rows that have been minimally tilled and prepared for planting. It is appreciated that the areas between the formed rows are left substantially untilled and undisturbed. The result is that the total land is conserved and the living organisms found in the top layer or layers of soil remain undisturbed and alive. The result is that the land is tilled to take advantage of the natural characteristics and advantages of the soil without destroying the soil and causing the soil to be damaged.

The present invention may, of course, be carried out in other specific ways than those herein set forth without parting from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. An agricultural tilling implement for preparing one or more planting rows while minimizing the tillage of the land, comprising in combination:
   a) a frame structure;
   b) a colter mounted to the front of the frame structure;
   c) a ripper mounted behind the colter and aligned therewith for penetrating the earth and ripping a trench therethrough;
   d) a rotor tiller aligned with the ripper and disposed behind the ripper;
   e) a housing surrounding the rotor tiller and including a top and a pair of sides wherein the sides extend downwardly and terminate adjacent the soil so as to generally confine the tilled soil within the housing as the implement moves over the land;
   f) a drive assembly connected to the rotor tiller for driving the same;
   g) a pair of laterally spaced soil confining panels extend from the rotor tiller and forwardly of the ripper for confining soil passing between the confining panels; and
   h) a packer mounted behind the rotor tiller and the rotor tiller housing for compacting the tilled strip of soil formed by the rotor tiller.

2. The agricultural implement of claim 1 wherein the rotor tiller housing includes front and rear openings.

3. The agricultural implement of claim 2 wherein the rear opening formed in the rotor tiller housing includes a pair of tapered tail sections.

4. The agricultural implement of claim 1 wherein the implement includes a multi-row capability and includes a series of row units with each row unit including a colter, ripper, rotor tiller, confining panels, rotor tiller housing, and packer.

5. The agricultural implement of claim 1 wherein the frame structure includes a ripper subframe and a rotor tiller subframe and wherein the ripper and rotor tiller subframes are connected together.

6. The agricultural implement of claim 5 wherein the soil packer includes a packer frame structure and wherein the packer frame structure extends rearwardly from the rotor tiller subframe structure.

7. The agricultural implement of claim 4 wherein the multi-row units define a pair of wheel cavities for receiving the rear wheels of a tractor and wherein each wheel cavity is located between a pair of laterally spaced colters.

8. The agricultural implement of claim 5 wherein the ripper subframe structure includes a pair of adjustable gauge wheels mounted on opposite ends thereof.

9. The agricultural implement of claim 1 wherein the pair of laterally spaced soil confining panels include a front opening and a rear opening and wherein the soil confining panels tend to taper inwardly towards each other from the front opening to the rear opening.

10. A method of forming and preparing a row for planting with a minimum of soil tillage, comprising the steps of:
    a) engaging and penetrating the soil with a disk-type colter;
    b) following the disk-type colter with a ripper and penetrating and ripping the soil along a line generally defined by the disk-type colter;
    c) following the ripper with a rotor tiller and engaging and tilling the soil behind the ripper with the rotor tiller;
    d) confining the tilled soil being moved by the rotor tiller to an area around the rotor tiller by enclosing the rotor tiller in a housing structure having a top and depending side walls that extend down adjacent the soil such that soil being engaged by the rotating action of the rotor tiller is confined about the rotor tiller itself;
    e) laterally confining the soil between the ripper and rotor tiller as the ripper and rotor tiller move through a field by providing a pair of laterally spaced soil confining panels that extend from the rotor tiller and forwardly of the ripper; and
    d) compacting the tilled beds formed by the colter, ripper, and rotor tiller after the soil has been engaged and conditioned by the rotor tiller.

11. The method of claim 10 including the step of forming a series of side-by-side rows with untilled areas spaced between the formed planting rows.

12. The method of claim 10 wherein the steps are performed by a pull-type agricultural implement and wherein the implement is tucked closely behind a tractor when performing the method and wherein the rear tractor tires project into the forward plane of the agricultural implement.

13. The method of claim 10 wherein a series of planting rows are formed with each planting row being approximately 6–12 inches wide and tilled to a depth of approximately three and one-half to five inches and wherein the areas between the tilled and formed rows are left substantially untilled.

* * * * *